United States Patent
Zettner

(10) Patent No.: US 8,666,890 B1
(45) Date of Patent: Mar. 4, 2014

(54) MULTI-PURPOSE TRANSACTION ACCOUNT

(75) Inventor: Steven Dale Zettner, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 2274 days.

(21) Appl. No.: 11/613,532

(22) Filed: Dec. 20, 2006

Related U.S. Application Data

(60) Provisional application No. 60/872,434, filed on Dec. 29, 2005.

(51) Int. Cl.
*G06Q 40/00* (2012.01)

(52) U.S. Cl.
USPC .......................................................... 705/41

(58) Field of Classification Search
USPC .......................................................... 705/41
See application file for complete search history.

(56) References Cited

U.S. PATENT DOCUMENTS

| | | | |
|---|---|---|---|
| 6,038,552 A | 3/2000 | Fleischl et al. |
| 6,049,782 A | 4/2000 | Gottesman et al. |
| 6,836,764 B1 | 12/2004 | Hucal |
| 7,080,032 B2 | 7/2006 | Abbs et al. |
| 7,117,172 B1 | 10/2006 | Black |
| 7,509,286 B1 | 3/2009 | Bent et al. |
| 2002/0095303 A1 | 7/2002 | Asayama et al. |
| 2002/0165829 A1 | 11/2002 | Jones et al. |
| 2003/0009402 A1 | 1/2003 | Mullen et al. |
| 2003/0046094 A1 | 3/2003 | Singh et al. |
| 2003/0101131 A1 | 5/2003 | Warren et al. |
| 2003/0163419 A1 | 8/2003 | Asano et al. |
| 2004/0010462 A1 | 1/2004 | Moon et al. |
| 2004/0117300 A1 | 6/2004 | Jones et al. |
| 2004/0122736 A1 | 6/2004 | Strock et al. |
| 2005/0021457 A1 | 1/2005 | Johnson et al. |
| 2005/0080694 A1 | 4/2005 | Schmidt |
| 2005/0197932 A1 | 9/2005 | Gati |
| 2005/0276458 A1 | 12/2005 | Jones et al. |
| 2006/0064368 A1 | 3/2006 | Forte |
| 2006/0074804 A1 | 4/2006 | Cinar |

(Continued)

OTHER PUBLICATIONS

Bank of America Corporation, "Frequently Asked Questions: Overdraft Protection," http://www.bankofamerica.com/deposits/checksave/index.cfm?template=lc_faq+overdraft, 2007, 1 page.

(Continued)

*Primary Examiner* — Charles Kyle
*Assistant Examiner* — Asha Puttaiah
(74) *Attorney, Agent, or Firm* — Perkins Coie LLP

(57) ABSTRACT

A transaction account is disclosed that includes attributes of a checking or savings account in that, for example, an account holder earns interest on a positive balance in the account. The transaction account additionally includes attributes of a credit-card-type account in that the account holder owes interest on a negative balance in the account. With such an account having the positive and negative balance attributes of checking or savings accounts and of credit-card-like accounts, the account holder or customer may manage the account more efficiently than by maintaining multiple accounts. The financial institution may save costs resulting from the overhead associated with maintaining numerous accounts for the same customer. Finally, the financial institution may benefit from charging a credit-card-like transaction fee to merchants that accept the card even if the transaction results in a positive balance in the transaction account.

20 Claims, 7 Drawing Sheets

(56) References Cited

U.S. PATENT DOCUMENTS

| | | | |
|---|---|---|---|
| 2006/0106693 A1 | 5/2006 | Carlson et al. | |
| 2006/0106696 A1 | 5/2006 | Carlson et al. | |
| 2006/0190399 A1 | 8/2006 | Silverman | |
| 2006/0195390 A1 | 8/2006 | Rusk et al. | |
| 2006/0206401 A1 | 9/2006 | Abbs et al. | |
| 2007/0027799 A1* | 2/2007 | Manelis et al. | 705/38 |
| 2007/0106581 A1 | 5/2007 | Mitchell et al. | |
| 2007/0168265 A1 | 7/2007 | Rosenberger | |
| 2008/0010189 A1 | 1/2008 | Rosenberger | |
| 2008/0021829 A1 | 1/2008 | Kranzley | |

OTHER PUBLICATIONS

Fifth Third Bank, "Fifth Third Interest Checking," https://www.53.com/wps/portal/pv/?New_WCM_Context=/wps/wcm/connect/FifthThird, 2007, 2 pages.

Manufacturers and Traders Trust Company, "Checking & Savings," http://www.mandtbank.com/personal/daily/classicwinterest.cfm, 2007, 1 page.

Use Credit Union, "Checking & Savings: Checking Accounts," http://www.usecu.org/home/cns.cns_chk, 2007, 2 pages.

"Toward the Single Account" United States Investor/ Eastern Banker, Dec. 16, 1974, vol. 85, Issue 25, 4 pgs.

"Delaware Statutes and Regulations" www.beneficial.com/learn-about-loans/attachments/Delaware_Disclosure.pdf, 5 pgs, Nov. 1, 1999

"Using a Checking Account" www.dcu.org/streewise, Web Archive, Jan. 10, 2006, 12 pgs.

"Citibank Checking Plus Variable Rate Account Agreement & Disclosure" Aug. 1, 2002, 7 pgs.

www.bankrate.com, Web Achive, Feb. 24, 2004, 4 pgs.

www.unicreditcorn, Web Archive, Oct. 24, 2005, 4 pgs.

* cited by examiner

500

Name of Financial Institution         Account: 123 345 456

Statement Date:   2/1/2005          Statement Period:   1/1/2005 – 2/1/2005   510

Customer Name: John Doe   Customer Address:   1313 Mockingbird Lane,
                                                     Capital City, State, 00001

Balance on 1/1/2005: $1000.00      Balance on 2/1/2005: $1000.00   520

Deposits during period (other than by plastic card):
| Date | Credit amount |
|---|---|
| 1/1/05 | $200.00 |
| 1/10/05 | $200.00 |
| 1/15/05 | $200.00 |
| 1/30/05 | $1500.00 |

530

Paper check transactions:
| Date | Check No. | Debit amount |
|---|---|---|
| 1/2/05 | 001 | $1000.00 |
| 1/11/05 | 002 | $300.00 |
| 1/16/15 | 003 | $200.00 |

540

Plastic card transactions:
| Date | Debit amount | Credit amount |
|---|---|---|
| 1/3/05 | $100.00 | |
| 1/12/05 | $400.00 | |
| 1/17/05 | $500.00 | |
| 1/25/05 | | $400.00 |

550

Combined transactions:
| Date | Debits | Credits | Balance |
|---|---|---|---|
| 1/1/05 | | $200.00 | $1200.00 |
| 1/2/05 | $1000.00 | | $200.00 |
| 1/3/05 | $100.00 | | $100.00 |
| 1/10/05 | | $200 | $300.00 |
| 1/11/05 | $300.00 | | $ 0.00 |
| 1/12/05 | $400.00 | | -$400.00 |
| 1/15/05 | | $200.00 | -$200.00 |
| 1/16/05 | $200.00 | | -$400.00 |
| 1/17/05 | $500.00 | | -$900.00 |
| 1/25/05 | | $400.00 | -$500.00 |
| 1/30/05 | | $1500.00 | $1000.00 |

MULTI-PURPOSE TRANSACTION ACCOUNT

CROSS-REFERENCE TO RELATED APPLICATIONS

This application claims benefit under 35 U.S.C. §119(e) of provisional U.S. patent application Ser. No. 60/872,434, filed Dec. 29, 2005, which was converted from U.S. patent application Ser. No. 11/321,975 pursuant to Applicant's Request to Convert Nonprovisional Application to A Provisional Patent Application filed on Feb. 24, 2006.

The subject matter disclosed in this patent application is related to subject matter disclosed and claimed in the following U.S. patent applications, each of which was filed on Dec. 20, 2006: U.S. patent application Ser. No. 11/613,557, now abandoned; U.S. patent application Ser. No. 11/613,574, now abandoned; U.S. patent application Ser. No. 11/613,601, now U.S. Pat. No. 8,103,582; and U.S. patent application Ser. No. 11/613,622, now abandoned.

The contents of the above-referenced provisional U.S. patent application and U.S. patent applications are incorporated herein by reference in their entireties.

BACKGROUND

A customer may open and maintain numerous accounts at a single financial institution such as, for example, a bank or a credit union. For example, a customer may be an account holder of a checking account, a savings account, and a credit card account at the same bank. Under such circumstances, the customer or account holder may manage the different accounts. For example, the account holder may receive separate statements for each account, make payments against the credit card account, and make deposits to and track withdrawals from the checking and savings accounts.

Financial institutions or banks also incur overhead when maintaining separate accounts for each customer. For example, the financial institution may track deposits, withdrawals, and accrued interest associated with various accounts for an account holder. The financial institution may apply payments made to, for example, a credit card account, and process withdrawals from and deposits to checking and savings accounts. The financial institution may generate and mail statements for each account to the customer on a periodic basis. Additionally, maintaining separate accounts may require training employees to handle each different type of account. For example, a first group of employees may be trained to process transactions regarding customer checking accounts but may not know how to process transactions regarding customer credit card accounts, and vice versa. Similarly, different processing systems may be used for each of the accounts. For example, hardware and software used to maintain customer credit card accounts may be different from hardware and software used to maintain customer savings accounts.

A mechanism to more closely align such multiple accounts may be developing in which an account holder may be provided a card that appears to the merchant, for example, as a credit card, but that is actually tied to another account of the customer such as, for example, a checking account or a savings account. Such a card may be referred to as a debit card. When a customer uses the debit card to purchase a product, the customer's checking account or savings account may fund the purchase rather than a charge being incurred against a credit-card account. Some financial institutions offer overdraft protection as well, automatically charging a separate credit-card account if the account holder overdraws on a checking account using a debit card. Thus, debit cards may provide the convenient functionality of credit cards without requiring the customer to write checks or even worry about whether there are funds in the debit account to cover a transaction. Even when linking two types of accounts together, however, the financial institution and customer alike still may maintain the two accounts.

For maximum efficiency, a financial institution may train employees to handle a combination of credit-card accounts, checking accounts, debit-card accounts, and savings accounts. Even with such increased efficiency, the financial institution incurs overhead costs in maintaining the separate accounts. For example, for each account, the financial institution maintains the customer's information (e.g., address) and continues to track transactions for each account and provide the customer with periodic statements of account activity.

Thus separate accounts create administrative burdens on the financial institution, resulting in inconvenience and increased transaction costs for the institution that may be passed on to the customers or account holders. Likewise, the separate accounts create an administrative burden on the customer who maintains the accounts and receives separate statements regarding each account.

SUMMARY

A transaction account is disclosed that includes attributes of a deposit account (e.g., a checking, savings, money-market, or brokerage account) in that, for example, an account holder earns interest on a positive balance in the account. The transaction account additionally includes attributes of a credit-card-type account in that the account holder owes interest on a negative balance in the account. The transaction account may include a credit limit, preventing the account from sustaining a negative balance in excess of some established amount. Additionally, the financial institution may be liable for insurance premiums for a positive balance in the account. Such positive balance reflects the debt of the financial institution, and thus the financial institution may pay insurance premiums based on the debt to an insurance company such as, for example, the Federal Deposit Insurance Corporation. Because the premium is based on the amount of debt reflected by the positive account balance, such premiums may be zeroed when the balance becomes negative.

With such an account having the positive and negative balance attributes of deposit accounts and of credit-card-like accounts, the account holder or customer may manage the account more efficiently than by maintaining multiple accounts. For example, the customer may receive only one statement summarizing both credit and debit transactions on the account, whether the transactions leave a positive or negative balance. Additionally, the customer may earn interest on any positive balance but can treat the account like a credit-card account, and thus may not need to worry that a transaction results in a negative balance.

The financial institution also may benefit from a transaction account having positive and negative balance attributes. The institution may save costs resulting from the overhead associated with maintaining numerous accounts for the same customer. For example, the institution may save training costs because employees may need to be trained only with regard to the transaction accounts rather than, for example, training employees with regard to checking accounts, savings accounts, credit-card accounts, and debit-card accounts. Moreover, the institution may implement one hardware/software system for the transaction account rather than systems for each individual type of account. The institution additionally may set a credit limit to $0 if desired so that the transaction account, in essence, is a typical checking or savings account and does not provide for extending automatic credit to a customer. Finally, the financial institution may benefit from charging a credit-card-like transaction fee to merchants that accept the card even if the transaction results in a positive balance in the transaction account. These and other potential benefits of such a transaction account may be described further herein.

BRIEF DESCRIPTION OF THE DRAWINGS

FIG. 5 is an example of a statement that may be generated for an example transaction account.

DETAILED DESCRIPTION OF ILLUSTRATIVE EMBODIMENTS

Figure 1:
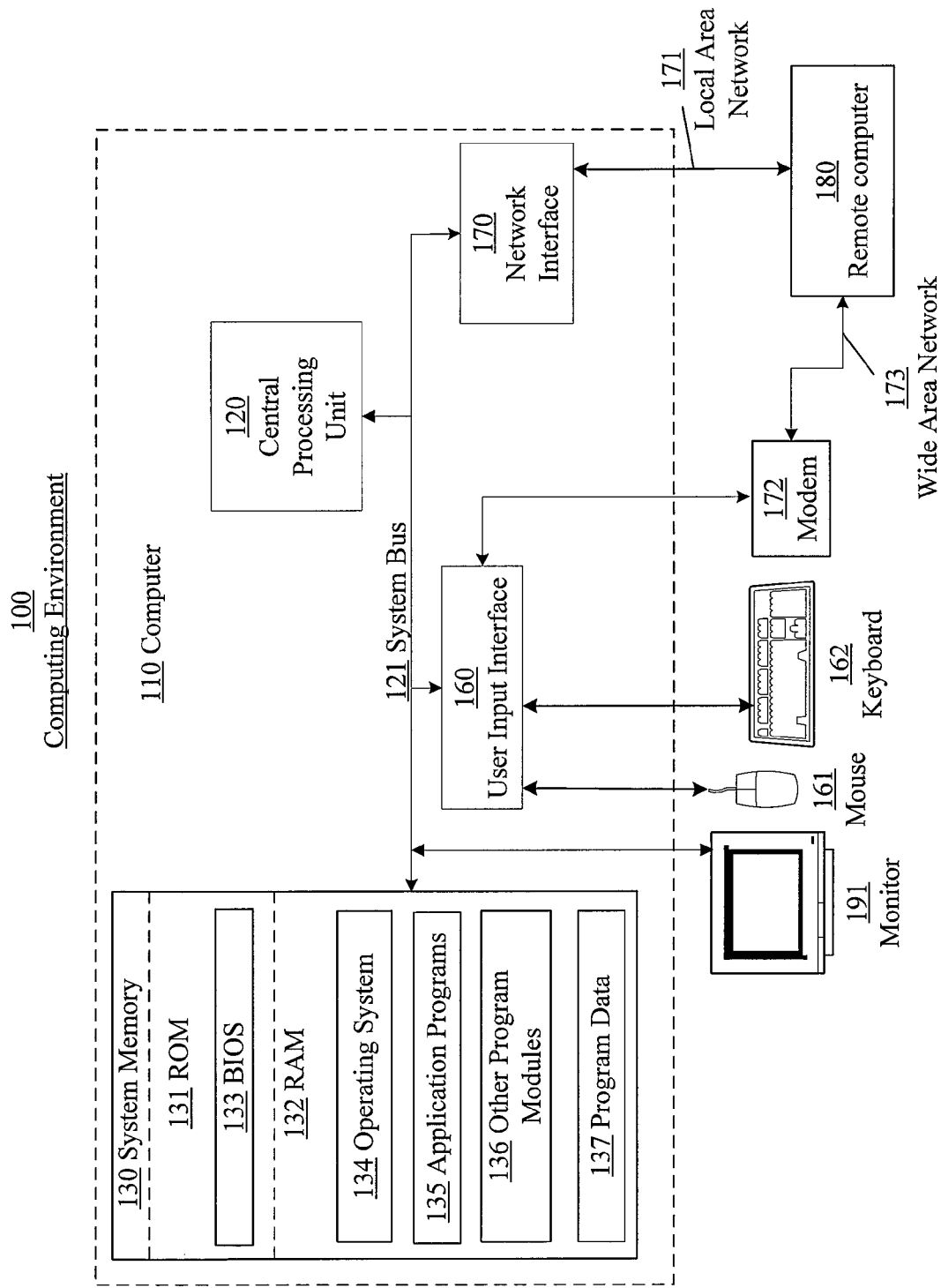
FIG. 1 depicts an example computing environment on which an example embodiment of a transaction account may be implemented.

Systems and methods for maintaining a transaction account at a financial institution are disclosed. The transaction account may include features of deposit accounts as well as credit accounts. The transaction account may have the functionality of a credit account and also the positive-balance features of a deposit account.

The transaction account may operate as a deposit account (e.g., a checking, savings, money-market, or brokerage account) when the account balance is positive or above some predetermined amount. For example, the account may accrue interest to the benefit of the account holder. Such interest may be accrued starting immediately when the balance becomes positive. The account holder may be able to write checks or use a plastic card similar to a credit card to draw on the funds. A customer may use electronic fund transfers to deposit into or withdraw from the account.

The transaction account may operate as a credit account (e.g., a credit card account, a home equity loan account, an unsecured loan account, a margin account). For example, interest may accrue to the benefit of the financial institution. Rather than accruing when the account balance is negative or below the predetermined amount, however, such interest may accrue only at the end of a billing cycle (e.g., at the end of a month). The interest may be variable such that, for example, as the negative balance increases, the interest rate increases. That is, an account holder may desire to accrue interest on a positive balance immediately but be charged interest only at the end of a billing cycle. Finally, the merchant accepting a card associated with a transaction account for payment of a product may be charged a transaction fee based a credit transaction (e.g., a credit card transaction), which may be greater than a transaction fee based on a debit card.

Contrary to credit accounts, however, the transaction account may have attributes that may make it an attractive alternative to a credit-only account. For example, checks may be written on the account even if resulting in a negative balance. Such checks may not incur a fee such as may be common with cash advances on credit accounts. Additionally, the credit account may not be associated with a late fee for late payment against the negative balance.

The transaction account may be implemented by a hardware/software system requiring training of only one set of employees to handle the transaction accounts of account holders (e.g., customers of the financial institution). The transaction account may also be associated with a single rewards program, that is, an incentive program where the customer earns "points" having some value when using the account to make purchases, for example. The transaction account may, like a debit account, allow for access with a card resembling a credit card. Additionally, the transaction fee charged to a merchant, for example, that accepts a purchase with the card may be similar to a credit-card transaction fee even when purchases are applied against a positive balance in the transaction account. In this way, the financial institution may have an incentive to use such transaction accounts, as typically the fee charged to the merchant for using a credit card is higher than the fee charged for using a debit card. Moreover, overdraft protection may be automatic, without a separate setup or linking of a checking with a credit card account, for example. The transaction account may feature paper checks as well. When the account balance is below zero, the paper check may be recorded as a credit-card-like charge. Contrary to credit-card-account checks, however, use of the transaction account check may not incur a fee for a cash advance common with typical credit card accounts.

Thus, the transaction account may increase efficiency and help eliminate costs associated with overhead at the financial institution for maintaining multiple accounts for a single customer. The transaction account additionally provides the customer with a single account where interest is accrued for positive balances while maintaining the convenience of a credit card.

FIG. 1 depicts an example computing environment 100 on which an example embodiment of a transaction account may be implemented. The computing environment 100 may include a computer 110, a monitor 191, and other input or output devices such as a mouse 161, a keyboard 162, and a modem 172.

Components of the computer 110 may include a central processing unit 120, a system memory 130, and a system bus 121 that couples various system components including the system memory 130 to the central processing unit 120.

The system memory 130 may include computer storage media in the form of volatile and/or nonvolatile memory such as ROM 131 and RAM 132. A basic input/output system 133 (BIOS) containing basic routines that help to transfer information between elements within computer 110, such as during start-up, may be stored in ROM 131. RAM 132 typically contains data and/or program modules that are immediately accessible to and/or presently being operated on by the central processing unit 120. The system memory 130 additionally may include, for example, an operating system 134, application programs 135, other program modules 136, and program data 137.

Embodiments of the invention may be implemented in the computing environment 100 in the form of any of a variety of computer readable media. Computer readable media can be any media that can be accessed by computer 110, including both volatile and nonvolatile, removable and non-removable media.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments may be common in offices, enterprise-wide computer networks, intranets, and the Internet.

When used in a LAN networking environment, the computer 110 may be connected to the LAN 171 through a network interface 170. When used in a WAN networking environment, the computer 110 may include a modem 172 for establishing communications over the WAN 173, such as the Internet. The modem 172 may be connected to the system bus 121 via the user input interface 160, or other appropriate mechanism.

A computer 110 or other client device can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Figure 2:
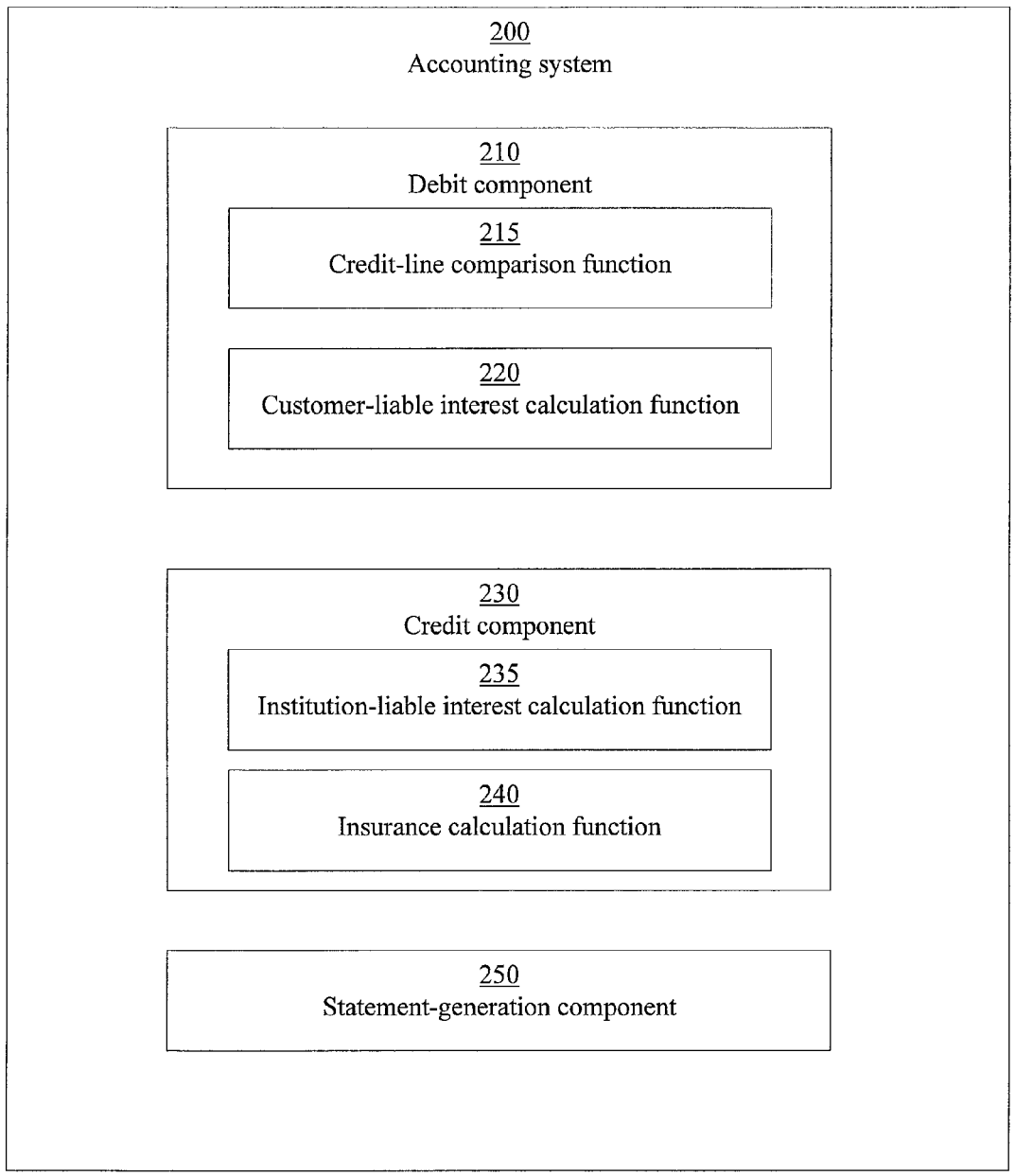
FIG. 2 depicts an example accounting system for managing a transaction account in accordance with one example embodiment of the invention.

FIG. 2 depicts an example accounting system 200 for managing the transaction account in accordance with one example embodiment of the invention. The accounting system 200 may be an application program residing in the application programs 135 of the system memory 130 of the computer 110. The program code of the accounting system 200 additionally may be executed by the central processing unit 120 of the computer 110, with results displayed on the monitor 191. Additionally, the results of the execution of the accounting system 200 may be displayed at the remote computer 180, which may be, for example, a customer's or account holder's computer.

The accounting system 200 may include a debit component 210, a credit component 230, and a statement-generation component 250. Each component 210, 230, 250 may be, for example, implemented through execution of applicable program code. The execution may be triggered by, for example, an event regarding a customer's transaction account. For example, the debit component 210 of the account system 200 may be executed when the customer's transaction-account balance falls below $0. Additionally, the debit component 210 may be executed for each transaction that results in a transaction-account balance that remains below $0. The credit component 230 may be executed when the customer's transaction-account balance rises above $0. Additionally, the credit component 230 may be executed for each transaction that results in a transaction-account balance that remains above $0. The statement component 250 may be executed when a certain time has passed since a previous transaction account statement was generated.

The debit component 210 may perform at least two functions. First, the debit component 210 may help ensure that the transaction account is not used if a current prospective transaction would result in creating a debt greater than a current credit line. That is, a credit-line comparison function 215 may be executed to check whether a requested transaction would require a credit line greater than the maximum allowable for the customer. Such a maximum allowable credit line may be imposed, for example, when the transaction account is created. A financial institution may establish a maximum allowable credit line based on factors such as, for example, past credit history, salary, and debt of an account holder. Alternatively, the customer may establish such a maximum allowable credit line so that, for example, the customer does not unwittingly draw more on the transaction account than desired. In alternative embodiments, the credit-line comparison function 215 may be negated or not used, allowing the customer to draw on the transaction account without limit. In a further alternative, the credit-line may be set to 0, preventing the account holder from maintaining a negative balance in the transaction account.

The debit component 210 additionally may include a customer-liable interest calculation function 220. The customer-liable interest calculation function 220 may determine any interest owed by customer on the debt in the transaction account for an appropriate time period. With each transaction where the transaction account balance remains below $0, the customer-liable interest calculation function 220 may determine the interest owed by the account holder and additionally may apply the result of the calculation to the debt, consistent with terms of the transaction account. The customer-liable interest calculation function may calculate simple or compound interest on the account holder's debt.

The credit component 230 may include an institution-liable interest calculation function 235. The institution-liable interest calculation function 235 may determine any interest owed to the account holder on the credit in the transaction account for an appropriate time period. The interest may be simple or compound. With each transaction, whether credit or debit, the institution-liable interest calculation function 235 may determine the interest owed to the customer and additionally may apply the result of the calculation to the credit balance consistent with the terms of the transaction account regarding the compounding of institution-liable interest in the account. Alternatively, such interest may be applied on a regular basis consistent with the transaction account terms.

The credit component 230 additionally may include an insurance calculation function 240. The insurance calculation function 240 may be executed to determine the premium that the financial institution may owe to an insurance institution, such as the Federal Deposit Insurance Corporation, based on the amount of credit in the transaction account (i.e., the debt of the financial institution to the account holder). That is, the financial institution may carry insurance for any debt it owes to account holders of the institution. Because the financial institution may not carry such insurance if the customer's transaction account has a negative balance (i.e., when the account holder is in debt to the financial institution), the credit component 230 may include a function to calculate the insurance premium only when the transaction account includes a positive balance.

The account system 200 may include a statement component function 250 that may generate a statement for the customer. The statement component function 250 may obtain information to be placed in the statement from the debit component 210 and the credit component 230. The statement that the statement component function 250 generates may be, for example, mailed to the customer or accessed by the customer at the remote computer 180 (FIG. 1). Example contents of the statement are further described herein.

Figure 3A:
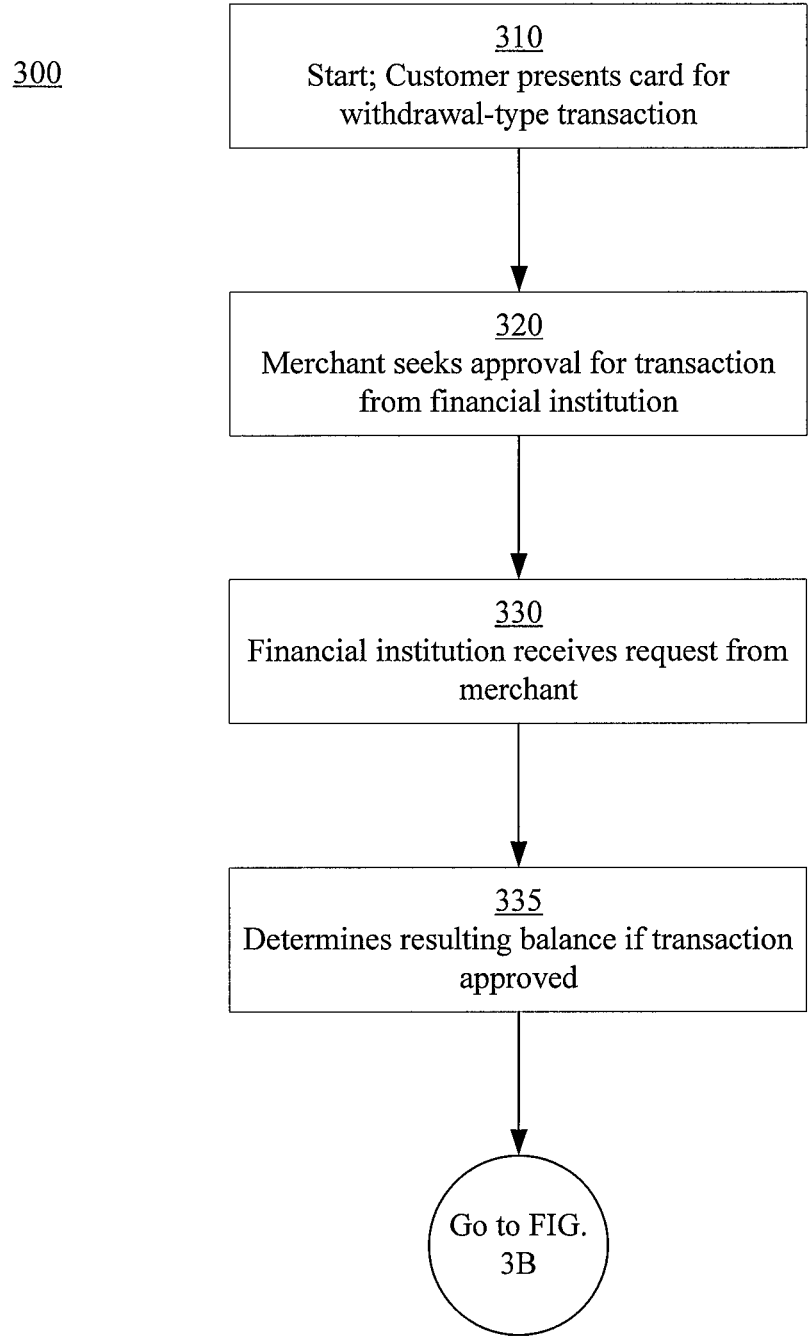
FIGS. 3A, 3B depict a flow diagram of an example method for processing a withdrawal from a transaction account according to an example embodiment of the invention.
Figure 3B:
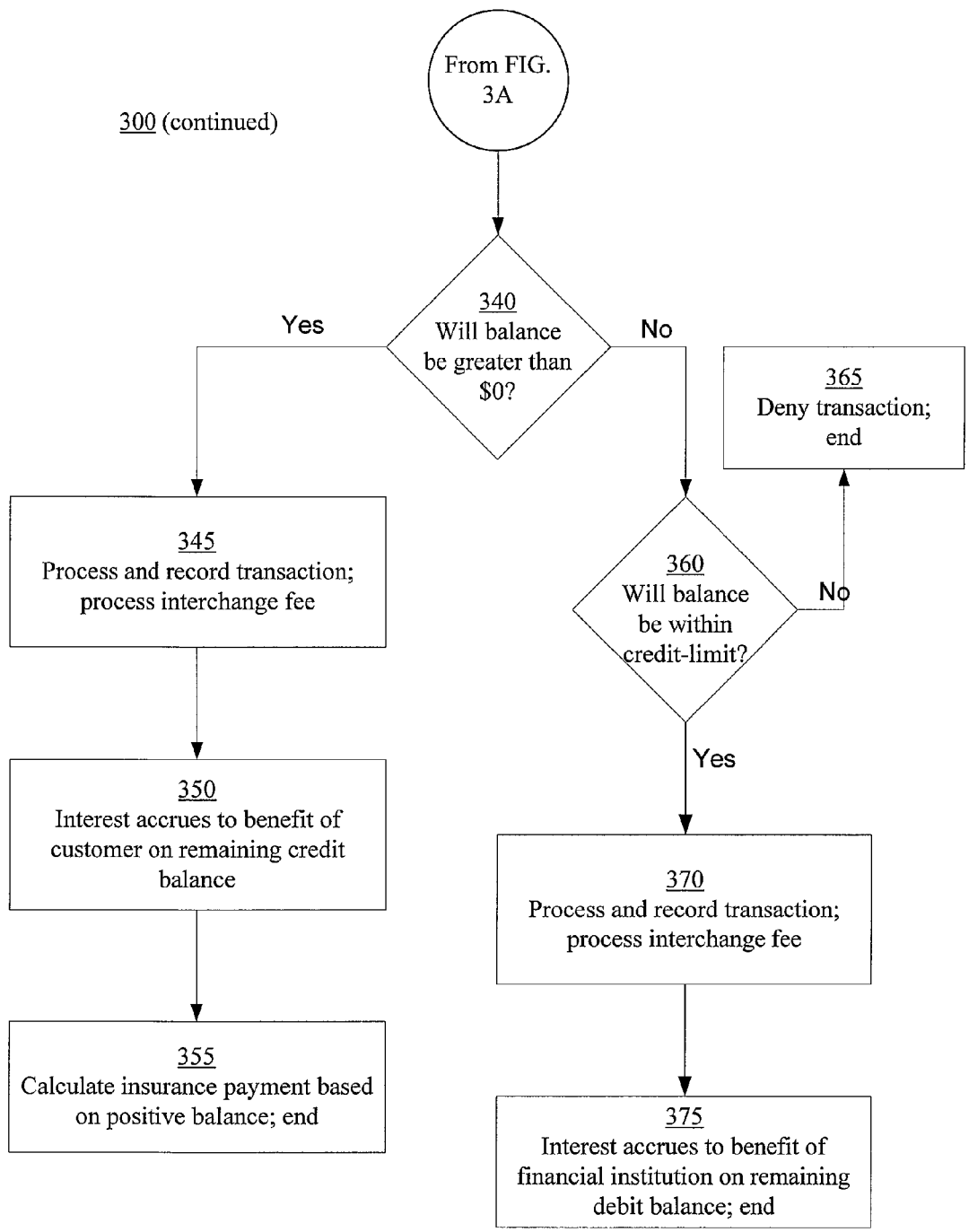

FIGS. 3A, 3B depict a flow diagram of an example method 300 for processing a withdrawal from a transaction account according to an example embodiment of the invention. The method may start at step 310 when a customer having a transaction account uses a plastic card akin to a credit card to purchase a product, for example, at a retail store. The plastic card may appear to the merchant of the retail store to be a credit card. The plastic card, however, may actually be linked to the transaction account. Thus, the merchant may process the card as it would any typical credit card, and therefore, the financial institution may charge a transaction fee for a credit card transaction. The financial institution may charge this fee regardless of whether the transaction account balance is positive or negative. That is, typically with credit card transactions, a financial institution may charge a higher transaction fee than when a customer pays with a debit card. With a transaction account, regardless of whether the transaction is a debit-card-type transaction against a positive balance or a credit-card-type transaction against a negative balance, the financial institution may charge the higher, credit-card transaction fee rather than the lower, debit-card transaction fee.

At step 320, the merchant may process the purchase. Such processing may include contacting the financial institution to seek approval or verify that the customer's transaction account can cover the prospective purchase. At step 330, the financial institution may receive the request from the merchant for the withdrawal or credit-card-type transaction. At step 335, the financial institution may determine the prospective balance of the transaction account that would result if the transaction is completed.

Referring to FIG. 3B, the prospective balance that would result if the transaction is completed is compared to zero at step 340 to determine if the balance in the account would be positive or negative. If the balance in the account would be positive or above some other threshold or predetermined amount, then at step 345, the financial institution processes the transaction. Such processing may include approving the transaction and reflecting the transaction in the account holder's transaction account. Such processing additionally may include processing the interchange fee that the merchant is charged for the transaction.

At step 350, the financial institution may begin calculating interest on the positive, credit balance in the account that accrues for the benefit of the customer. Stated another way, the financial institution may calculate the interest on the debt for which it is liable to the customer. Such calculation may be completed at any appropriate time such as, for example, when the deposit is received, providing the customer with immediate benefit for the positive balance. Alternatively, the calculation may be completed when the statement regarding the transaction account is generated for delivery to the customer.

The financial institution additionally may, at step 355, calculate the insurance payment it may be required to make under an insurance agreement to an insurer. The insurance agreement may, for example, insure the financial institution for any debt owed to customers or account holders of the institution. The premium for such insurance may be based on the actual amount in each customer's account, and therefore, when funds are depleted from a customer's account, the insurance premium based on the account may decrease.

Referring back to step 340 of the method 300, if the account balance will be negative at the conclusion of the transaction, then the financial institution may determine if the prospective resulting balance will be within a credit limit established on the transaction account. That is, a transaction account may include a credit limit, preventing withdrawals from the account when the credit limit is reached. Such a credit limit may be established, for example, by the financial institution when the transaction account for the customer is established. If the credit limit would be exceeded if the transaction was completed, then at step 365, the financial institution may deny or disapprove the transaction and transmit such denial to the merchant.

If, at step 360, the transaction account balance would be within the credit limit established on the account, then at step 370, the financial institution may process the transaction. Such processing may include approving the transaction and reflecting the transaction in the customer's transaction account. Such processing additionally may include processing the interchange fee that the merchant is charged for the transaction. The interchange fee may be that typically charged for credit card transactions.

At step 375, the financial institution may calculate interest owed by the customer to the financial institution based on the remaining negative balance in the account. Such determination may be made at any time such as, for example, when the statement regarding the transaction account is generated for the customer. Thus, the customer may not begin incurring interest on a negative balance until completion of a billing cycle, providing the customer with a benefit associated with, for example, typical credit card accounts. Contrary to step 355 of the method 300 where the financial institution calculates an insurance payment, such step may be absent when the account balance is negative because no insurance premium may be required on an account with a negative balance, as the financial institution is not liable for a debt owed to the account holder.

Figure 4A:
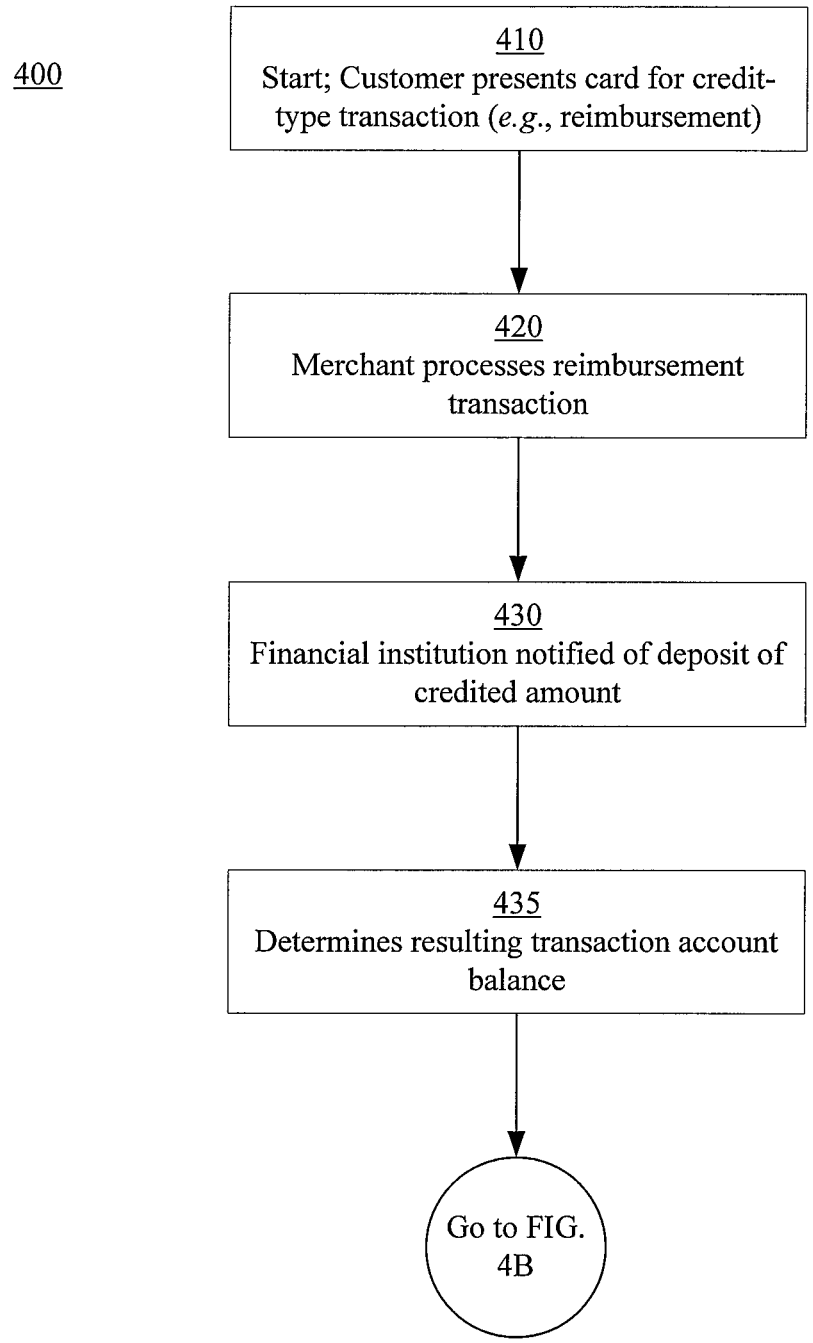
FIGS. 4A, 4B depict a flow diagram of an example method for processing a deposit to a transaction account according to an example embodiment of the invention.
Figure 4B:
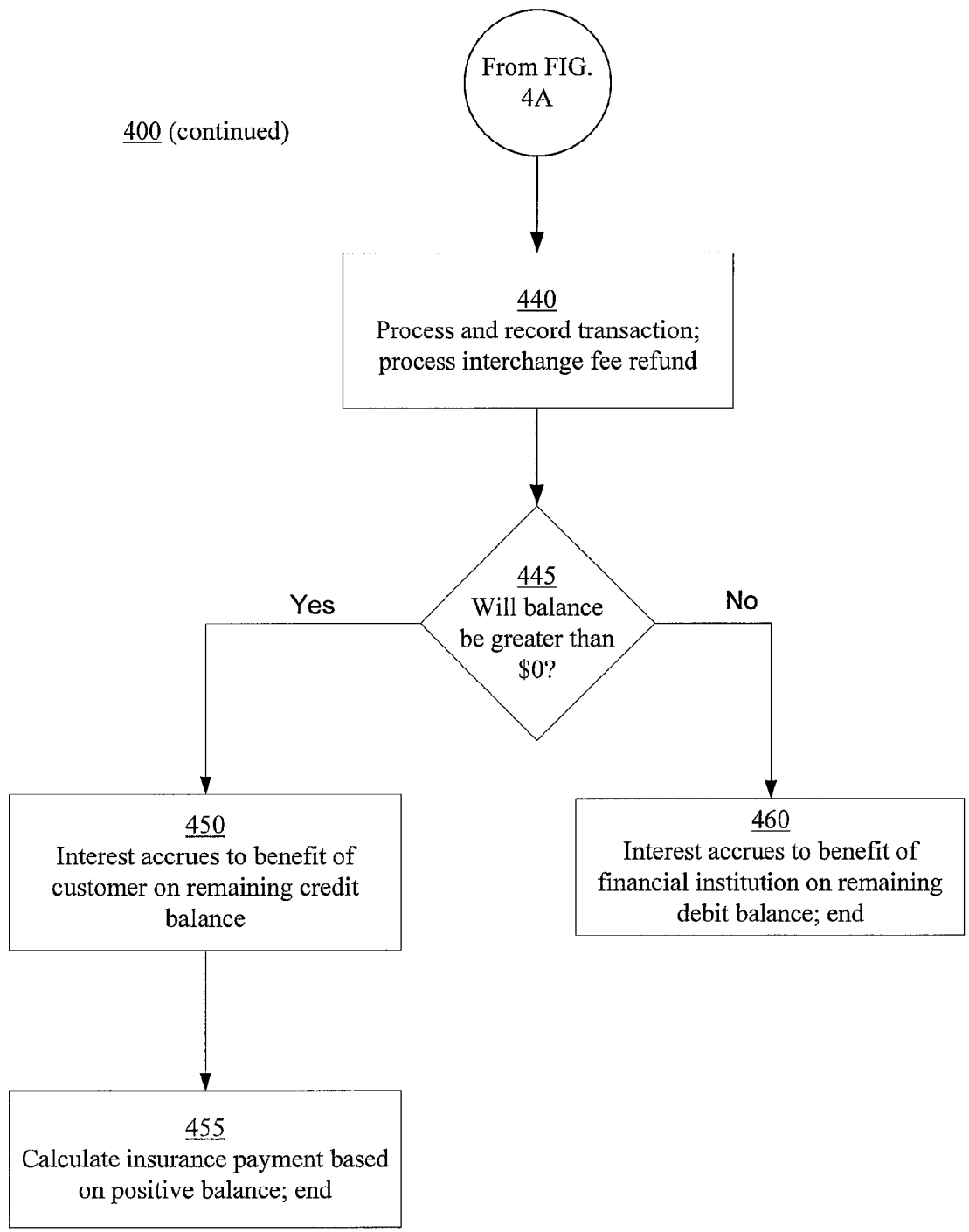

FIGS. 4A, 4B depict a flow diagram of an example method 400 for processing a deposit to a transaction account according to an example embodiment of the invention. The method may start at step 410 when a customer having a transaction account returns a product to a retail store, for example, and requests that the refund or reimbursement be applied to the transaction account. Of course, this is merely one example way for a deposit to be made, and there are other ways as well, including directly depositing the money in the account at the financial institution. The customer, for example, may present to the merchant of the retail store a plastic card akin to a credit card that is linked to the transaction account. Otherwise, the merchant, for example, may obtain the transaction account number from a receipt associated with the original purchase of the product being returned. Thus, the merchant may process the reimbursement transaction as it would for any typical credit card.

At step 420, the merchant may process the return or reimbursement. At step 430, the merchant may notify the financial institution of the refund and return the reimbursement to the financial institution. The financial institution may determine, at step 435, the resulting balance in the transaction account when including the reimbursement amount from the merchant.

Referring to FIG. 4B, the financial institution may, at step 440, process the transaction. Such processing may include reflecting the credited amount in the customer's account. Additionally, such processing may include refunding any interchange fee that the merchant may have been charged when, for example, the account holder originally purchased the product from the merchant using the plastic card associated with the transaction account.

At step 445, the financial institution may compare the balance to zero to determine if the balance in the account is positive or negative. If the balance in the account is positive, then at step 450, the financial institution may begin calculating interest on the balance in the account that accrues for the benefit of the customer. That is, the financial institution may calculate the interest on the debt for which it is liable to the customer. Such calculation may be completed at any appropriate time such as, for example, at the time of the transaction or when the statement regarding the transaction account is generated for delivery to the customer. The financial institution additionally may, at step 455, calculate an insurance payment it may be required to make under an insurance agreement to an insurer based on the positive transaction-account balance.

Referring back to step 445 of the method 400, if the account balance is negative then the financial institution, at step 460, may calculate interest owed by the customer to the financial institution based on the remaining negative balance in the account. Such determination may be made at any time such as, for example, when the statement regarding the transaction account is generated for the customer.

FIG. 5 is an example of a statement 500 that may be generated by, for example, the statement-generation component 250 of the accounting system 200 (FIG. 2). The example statement is shown for purposes of describing embodiments of the invention only. For example, other embodiments of the invention may show or track more attributes or less attributes of a transaction account.

The statement 500 may include an identification section 510 stating, for example, the name of the financial institution, the account number for the transaction account, the name of the account holder (e.g., customer) associated with the account, the statement's date, and the period covered by the statement. A balance section 520 of the statement 500 may provide balances of the transaction account at the beginning and at the end of the statement period reflected in the statement 500. The statement may include a deposit section 530, showing deposits into the transaction account during the statement period other than deposits made with a plastic card. The statement may include a paper check transactions section 540, indicating the paper checks that the customer has written that have drawn funds from the transaction account during the statement period. A plastic card transactions section 550 of the statement may show each transaction that was instigated by a plastic card associated with the transaction account. A combined transactions section 560 may show, in date order, all transactions (i.e., deposits, paper check, and plastic card transactions) during the statement period.

Referring to FIG. 5 and for purposes of example only, the starting balance on Jan. 1, 2005 was $1000. At this point, then, interest on the transaction account may be accruing to the benefit of the customer, John Doe, based on the positive balance in the account. Additionally, the financial institution may be paying an insurance premium based on the $1000 balance. On Jan. 1, 2005, a deposit of $200 may bring the balance to $1200 on which interest accruing to the benefit of John Doe is calculated and on which an insurance premium is calculated. On Jan. 2, 2005, $1000 may be withdrawn from the transaction account, leaving a positive balance of $200. The interest and insurance premium calculations may at this point be made on the remaining $200 balance. On Jan. 3, 2005, a further $100 may be withdrawn, leaving a balance of $100 on which the interest and insurance premium are calculated. On 1/10, a deposit of $200 may be credited to the account, leaving a balance of $300 on which the financial institution calculates interest accruing to the customer and calculates the insurance premium.

On Jan. 11, 2005, a debit of $300 may be made, drawing the remaining funds out of the transaction account leaving a balance of $0. Thus, on Jan. 11, 2005, no interest may be accruing to either the benefit of the customer or the financial institution. Also, the financial institution may not be liable for an insurance premium payment.

On Jan. 12, 2005, $400 may be withdrawn from the transaction account, resulting in a -$400 balance. The financial institution may thus calculate interest owed it by the account holder for the negative balance. On Jan. 15, 2005, $200 may be credited to the account and the financial institution may calculate interest accruing to its benefit based on the resulting -$200 balance. On Jan. 16, 2005 and on Jan. 17, 2005, withdrawals of $200 and $500, respectively, may be made, and the financial institution may accrue interest based on the remaining negative balance. A credit of $400 may be posted on Jan. 25, 2005, and the financial institution may accrue interest based on the remaining -$500 balance. Finally, on Jan. 30, 2005, a credit (e.g., a deposit) of $1500 may be made, resulting in a balance at the end of the statement period of $1000. The customer may accrue interest on this positive balance and the financial institution may calculate insurance premiums owed on the positive balance.

The methods of the present invention may be implemented in hardware, software or, where appropriate, a combination of both. Thus, the methods and apparatus of the present invention, or certain aspects or portions thereof, may take the form of program code (i.e., instructions) embodied in computer readable medium. A processor that executes program code for performing the steps of the methods of embodiments, as described in FIGS. 1-5 and as claimed, constitute a computing environment that embodies the present invention. In the case of program code execution on programmable computers, the computing environment will generally include a processor, a storage medium readable by the processor (including volatile and non-volatile memory and/or storage elements), at least one input device, and at least one output device. One or more programs are preferably implemented in a high level procedural or object oriented programming language to communicate with a computing environment. However, the program(s) can be implemented in assembly or machine language, if desired. In any case, the language may be a compiled or interpreted language, and combined with hardware implementations.

It is to be understood that the foregoing illustrative embodiments have been provided merely for the purpose of explanation and are in no way to be construed as limiting of the invention. Words which have been used herein are words of description and illustration, rather than words of limitation. Additionally, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

What is claimed is:

1. A method for maintaining a transaction account, comprising:
   receiving, by a computer system, a deposit of a first deposit amount of funds to an account, the account comprising a first balance amount representing a balance of the account prior to receiving the deposit, wherein the first balance amount comprises an amount of funds that is less than a predetermined amount;
   summing, by the computer system, the first deposit amount and the first balance amount, wherein the sum of the first deposit amount and the first balance amount comprises a second balance amount representing the balance of the account after receiving the deposit, the second balance amount comprising an amount of funds that is greater than the predetermined amount;

determining, by the computer system, a first interest amount by applying a first rate of interest to the first balance amount; and determining, by the computer system, a second interest amount by applying a second rate of interest to the second balance amount.

2. The method of claim 1, further comprising:
summing the first interest amount and the first balance amount.

3. The method of claim 2, wherein the account is associated with an account holder, and wherein the sum of the first interest amount and the first balance amount comprises a third amount of funds for which an account holder associated with the account is liable.

4. The method of claim 1, further comprising:
summing the second interest amount and the second balance amount.

5. The method of claim 4, wherein the account is managed by an entity and wherein the sum of the second interest amount and the second balance amount comprises a fourth amount of funds for which the entity is liable.

6. The method of claim 1, wherein the predetermined amount is 0.

7. The method of claim 1, wherein the first and second interest rates are the same.

8. The method of claim 1, further comprising:
generating a reward based on the deposit for the benefit of an account holder associated with the account.

9. The method of claim 1, further comprising:
determining an insurance premium based, at least in part, on the second balance amount.

10. A non-transitory computer-readable medium having program code stored thereon that, when executed by a computing environment, causes the computing environment to:
receive a deposit of a first deposit amount of funds to an account, the account comprising a first balance amount representing a balance of the account prior to receiving the deposit, wherein the first balance amount comprises an amount of funds that is less than a predetermined amount;
sum the first deposit amount and the first balance amount, wherein the sum of the first deposit amount and the first balance amount comprises a second balance amount representing the balance of the account after receiving the deposit, the second balance amount comprising an amount of funds that is greater than the predetermined amount;
determine a first interest amount by applying a first rate of interest to the first balance amount; and
determine a second interest amount by applying a second rate of interest to the second balance amount.

11. The non-transitory computer-readable medium of claim 10, having further program code stored thereon that, when executed by the computing environment, causes the computing environment to:
sum the first interest amount and the first balance amount.

12. The non-transitory computer-readable medium of claim 11 wherein the sum of the first interest amount and the first balance amount is a third amount of funds for which an account holder associated with the account is liable.

13. The non-transitory computer-readable medium of claim 10, having further program code stored thereon that, when executed by the computing environment, causes the computing environment to:
sum the second interest amount and the second balance amount.

14. The non-transitory computer-readable medium of claim 13, wherein the account is managed by an entity and wherein the sum of the second interest amount and the second balance amount is a fourth amount of funds for which the entity is liable.

15. The non-transitory computer-readable medium of claim 10, wherein the predetermined amount is 0.

16. The non-transitory computer-readable medium of claim 10, having further program code stored thereon that, when executed by the computing environment, causes the computing environment to:
determine an insurance premium based on the second balance amount.

17. An accounting system for maintaining an account, comprising:
a microprocessor; and
a credit component containing instructions tangibly embodied on a computer-readable medium, which instructions, when executed by the microprocessor, cause the microprocessor to:
receive a deposit of a first deposit amount of funds to an account, the account comprising a first balance amount representing a balance of the account prior to receiving the deposit, wherein the first balance amount comprises an amount of funds that is less than a predetermined amount;
sum the first deposit amount and the first balance amount, wherein the sum of the first deposit amount and the first balance amount comprises a second balance amount representing the balance of the account after receiving the deposit, the second balance amount comprising an amount of funds that is greater than the predetermined amount;
determine a first interest amount by applying a first rate of interest to the first balance amount; and
determine a second interest amount by applying a second rate of interest to the second balance amount.

18. The system of claim 17, further comprising:
wherein the predetermined amount is 0.

19. The system of claim 17, wherein the credit component additionally is for determining an insurance premium based on the second balance amount.

20. The system of claim 17, further comprising:
a statement-generation component for generating a statement.

* * * * *